United States Patent [19]

Hilakos

[11] Patent Number: 5,188,812

[45] Date of Patent: Feb. 23, 1993

[54] AUTOMATIC CONTROL SYSTEM FOR A PHOSACID ATTACK TANK AND FILTER

[75] Inventor: Stephen W. Hilakos, Valrico, Fla.

[73] Assignee: IMC Fertilizer, Inc., Northbrook, Ill.

[21] Appl. No.: 791,654

[22] Filed: Nov. 13, 1991

[51] Int. Cl.$^5$ ............................................. C01B 25/16
[52] U.S. Cl. .................................... 423/320; 423/319
[58] Field of Search ............................... 423/320, 319

[56] References Cited

U.S. PATENT DOCUMENTS

| | | |
|---|---|---|
| 3,086,849 | 4/1963 | Goldsmith . |
| 3,104,946 | 9/1963 | Veal ...................... 423/320 |
| 3,130,187 | 4/1964 | Tolin et al. . |
| 3,594,557 | 7/1971 | Anderson . |
| 4,332,590 | 6/1982 | Smith . |
| 4,358,827 | 11/1982 | Abbott . |
| 4,485,078 | 11/1984 | Weston et al. . |
| 4,501,724 | 2/1985 | Goers ...................... 423/320 |
| 4,543,637 | 9/1985 | Smith et al. . |
| 4,777,027 | 10/1988 | Davister et al. . |

FOREIGN PATENT DOCUMENTS

| | | |
|---|---|---|
| 597632 | 3/1978 | U.S.S.R. ...................... 423/320 |
| 1112025 | 9/1984 | U.S.S.R. . |
| 1411276 | 7/1988 | U.S.S.R. . |

Primary Examiner—Gregory A. Heller
Attorney, Agent, or Firm—Banner, Birch, McKie & Beckett

[57] ABSTRACT

A method for controlling the phosphoric acid product concentration in a continuous phosphoric acid recovery process comprising supplying a constant feed stream of phosphate ore to an attack tank wherein the phosphate ore is subjected to attack by sulfuric and phosphoric acids to produce a slurry comprising an aqueous phosphoric acid solution and calcium sulfate, filtering the slurry to form aqueous phosphoric acid and calcium sulfate filter cake, rinsing said filter cake with water, and adding said rinse water to the attack tank, calculating a first amount of water required to maintain a desired concentration of phosphoric acid in the slurry, said desired concentration calculated based on the concentration of phosphate ore in the feed stream and the filterability of the filter cake, determining the total actual amount of water added to the attack tank, and adjusting the amount of rinse water so that the amount of water added to the attack tank is sufficient to maintain the desired concentration of phosphoric acid in the slurry.

14 Claims, 6 Drawing Sheets

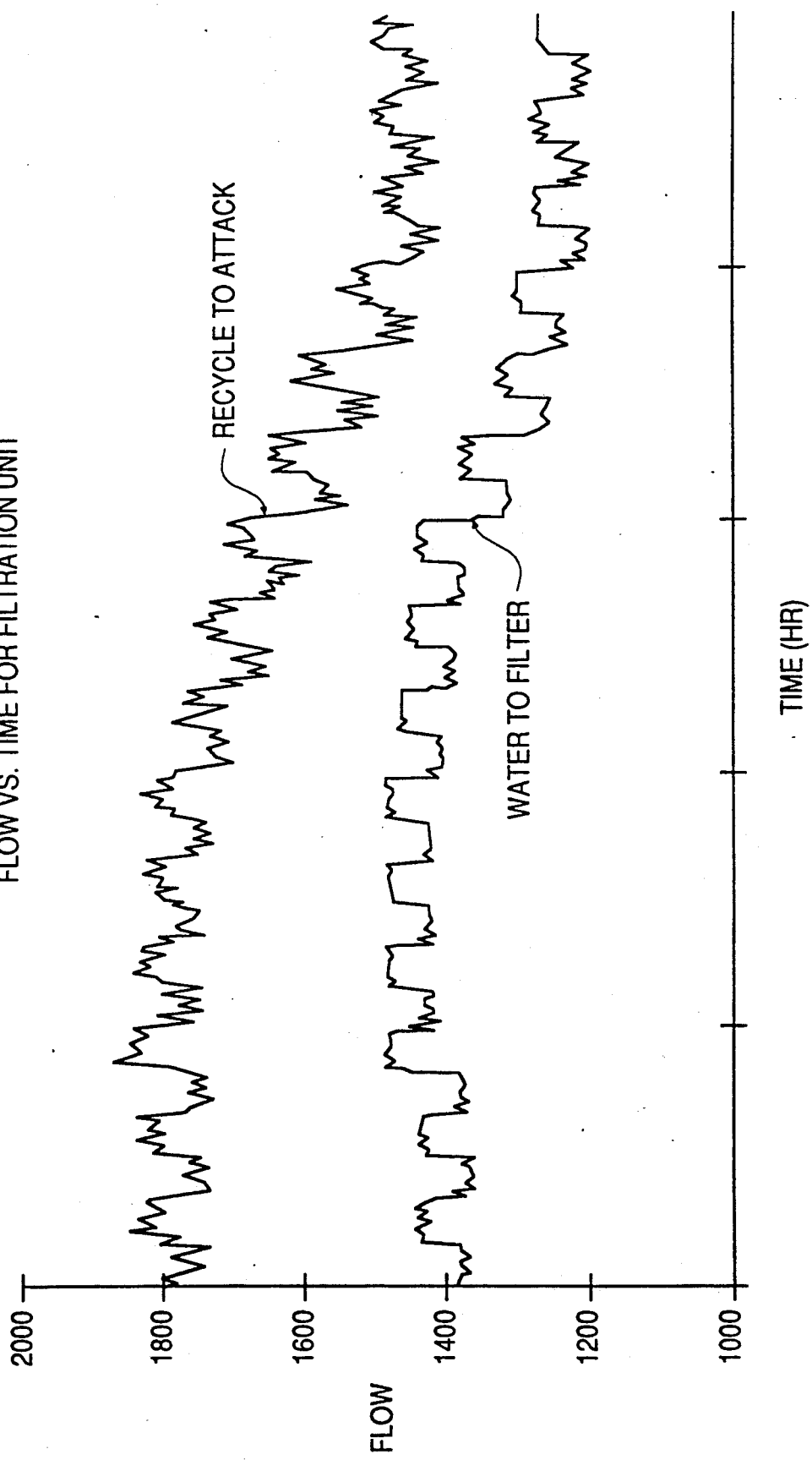

AUTOMATIC CONTROL SYSTEM FOR A PHOSACID ATTACK TANK AND FILTER

BACKGROUND OF THE INVENTION

1. Field of the Invention

The present invention generally relates to an automatic control system for controlling a chemical reaction in order to maximize efficiency, and more particularly to an automatic control system for controlling the operation of the attack tank and filtration unit in a phosphoric acid recovery plant in order to maximize the recovery of phosphoric acid.

Phosphoric acid ($H_3PO_4$) is an important intermediate chemical product. It is used primarily by the fertilizer industry, but also is useful in a number of other areas such as in detergents, water treatment, and food products.

Phosphoric acid is primarily produced by what is known in the art as the "wet process." Using the wet process, phosphate rock, which comprises calcium phosphate [$Ca_3PO_4$] and a number of impurities, is mined, mixed with water and then ground. Typically, ball mills or rod mills are used to obtain the desired size distribution. The ground wet rock then is fed to a reactor, or 'attack tank', and reacted with sulfuric acid. The process is represented by the following equation:

$$Ca_3(PO_4)_2 + 3H_2SO_4 + 6H_2O = 2H_3PO_4 + 3Ca(SO_4) \cdot 2H_2O \qquad A$$

The phosphoric acid thus produced remains in solution; calcium sulfate, commonly referred to as gypsum, is a crystalline solid under reaction conditions.

Although phosphoric acid is represented as $H_3PO_4$, plant output is often measured in tons of $P_2O_5$, or phosphorous pentoxide. Approximately 3 tons of 30% phosphoric acid aqueous solution is equivalent to about 1 ton of $P_2O_5$. It also is common in the trade to use the terms "phosphorous pentoxide" and "phosphoric acid" interchangeably. Thus, throughout the specification, use of the term "phosacid", when describing conditions in the attack tank, will refer to phosphorous pentoxide, and use of the term "phosacid", when describing the product from the filtration unit, will refer to phosphoric acid.

The reactor effluent, which comprises the phosphoric acid and gypsum, then is sent to a filtration unit wherein the solid gypsum is separated from the solution. The gypsum forms a filter cake and the filtrate comprises phosphoric acid solution. The filtrate is further treated before shipment.

The filter cake is washed with water to recover phosphorous values. Typically, a two or three-stage counter-current washing is utilized. Process water, which contains essentially no phosphorous values, is used to wash the gypsum cake a final time before the cake is removed as a by-product. The wash water, which contains some phosphoric acid, then is used in the penultimate washing, from which additional phosacid is recovered. In a third stage, the gypsum cake just separated from product acid is washed with the solution from the second washing. The solution from this third washing is introduced to the attack tank. This stream typically is known as an 'acid-recycle stream', as 'return acid', or simply as 'return'.

Reactor and filtration operating parameters should be closely controlled to ensure maximum recovery of phosphoric acid. Maximum recovery of phosphoric acid does not necessarily correlate with maximum concentration of phosacid in the reactor or the maximum concentration of phosacid in the product filtrate stream. Rather, the maximum recovery of product is obtained by maintaining an optimum concentration of phosacid in the reactor.

As set forth in Equation A above, water and sulfuric acid are fed to an attack tank along with phosphate ore. Typically, the ore is fed in the form of an aqueous slurry, and acid solution is recycled from the cake washings. It is typical to add a stoichiometric excess of water.

Water may be added by way of various process streams, including the feed phosphate ore stream, the acid recycle stream from the filter, or a raw water feed stream. Water required to provide the stoichiometric quantity of water in accordance with the reaction set forth in Equation A may be added by way of any one of these streams. It is common in the trade to add the water to the attack tank by way of the return acid from the filter unit. However, an operator must take care not to add water to the filter in a quantity that will oversaturate the gypsum filter cake. As skilled practitioners recognize, it is not desirable for the moisture content of the filter cake to be excessively high because water remaining in the cake effects the water balance in the attack tank. It is desirable to maintain an overall water balance on the attack tank and filter to maintain the stoichiometric relationship set forth in Equation A in the attack tank while at the same time maintaining the efficiency of the filter unit and the moisture content of the filter cake.

Typically, in manual operation of a phosacid attack tank and filter, an operator would vary the amount of water added to the filter by visual inspection of the moisture content of the filter cake discharged and the knowledge of concentration of phosacid in the attack tank. For example, low phosacid concentration decreases cake discharge moisture content. As a consequence of the low phosacid concentration, the operator would decrease the amount of water added to the filtration unit. This decreases the rate at which water is added the filter, and thus, less water will be added to the attack tank by way of the return acid. The lower quantity of return acid causes the phosacid concentration in the attack tank to increase. As the phosacid concentration in the attack tank increases, the operator would add water to the filter in an attempt to bring the concentration of phosacid in the attack tank to its optimum value. However, this additional water would cause the moisture content of the gypsum filter cake to increase, and still more water would have to be added to the filter to rinse the filter cake. However, under these conditions, the ability of the filter to accept more water would be marginal at best, because the gypsum crystals would be affected by the acid concentration. Also, as the concentration of phosacid in the attack tank increases, the viscosity of the reaction effluent increases, and the phosacid tends to adhere more easily to the gypsum crystals. The additional acid content of the slurry leaving the attack tank therefore causes the filterability of the gypsum filter cake to decrease and further reduces the efficiency of the filter. Thus, production rates of phosacid would decrease even though the concentration of phosacid in the attack tank was high.

Thus, keeping the phosacid concentration in the attack tank essentially constant is desirable to maximize phosphoric acid yield. Because the concentration of the phosphate ore fed to the attack tank is constantly changing, maintenance of the concentration of phosacid in the attack tank is difficult. Also, the sulphate and phosacid concentrations in the attack tank influence the growth and type of calcium sulfate crystals formed in the attack tank. Skilled practitioners recognize that gypsum crystal size and characteristics directly effect the filterability and washability of the reaction slurry solid effluent from the attack tank. Thus, there is a need to control the operating conditions in the attack tank and filtration unit to ensure a maximum yield of phosphoric acid.

Many factors affect the ability to maintain the phosacid concentration in the attack tank at this optimum concentration. The concentration of phosphate ore in the rock fed to the attack tank constantly changes because, inter alia, the quality and fineness (which affects reaction rate) of the rock, and the type and quantity of impurities in the rock, vary widely among different ore sites, and even at the same site. The quality or grade of the rock is determined by the concentration of phosphate ore present in the rock and the type and concentration of impurities therein. The fineness of the rock is determined by the rock itself and the process and equipment used to crush the rock.

To maintain the concentration of phosacid in the attack tank at its optimum value, the amount of water added to the attack tank must be adjusted to maintain the stoichiometry of Equation A above. The water addition rate must also be adjusted to compensate for differences in reaction rate caused by differences in fineness of the rock. Failure to consider fineness and its effect on reaction rate may cause the concentration of phosacid in the attack tank solution to change even though the mass flow rate of feed rock is constant.

Filterability of the reaction slurry (attack tank effluent) also affects product recovery. Because the amount of phosphate fed to the attack tank is not constant, the amount of sulfuric acid needed to effect the reaction set forth in Equation A above also changes. The amount of product and by-product produced thus are constantly changing, and these changes affect the chemical makeup of the filter cake. Thus, rinse water may be required at the filtration unit to further rinse the filter cake and remove the phosacid entrained therein, but the additional water may not be necessary at the attack tank. Further difficulties arise when unexpected mechanical problems (i.e., broken pumps, stuck valves, and the like) affect the flow rates of attack tank feed and effluent streams, and may cause the phosacid concentration in the attack tank to worsen drastically before these problems are detected.

2. Description Of The Prior Art

A number of prior art systems control the production of phosphoric acid by focusing on the excess sulfate concentration in the attack tank. Historically, sulfate control was achieved by using large tanks for the attack process, periodically measuring the excess sulfate level in the tank, and making adjustments in the acid or rock feed rates accordingly. Other approaches utilize continuous analysis of the rock or continuous analysis of the sulfate in the attack tank. However, these measurement devices were prone to breakage, and usually required a full time engineer to maintain.

One such control system for a phosphoric acid recovery plant is disclosed in U.S. Pat. No. 4,777,027, directed to a method for preparing phosacid and calcium sulfate. In accordance with the method disclosed, flow rates of mixtures circulating about the attack tank (i.e., recycle streams) are adjusted relative to the base flow rate of the feed streams. Based on specified conditions, the system of this patent controls reaction conditions in succeeding reaction zones of a multistage attack tank system so that the concentration of calcium sulphate is maintained at a desired value. By maintaining the desired concentration of calcium sulphate, a desired concentration of phosphoric acid is produced.

SUMMARY OF THE INVENTION

The present invention is based on the discovery that the concentration of phosacid in the attack tank can accurately be controlled by a method in which the overall amount of water added to the attack tank is continuously monitored and controlled, and the filter is controlled to ensure that an adequate amount of rinse water passes through the filter by adjusting the amount of water added to the filter. In accordance with the method, water is pulsed to the filtration unit, which comprises a counter-current wash unit, in fixed time increments. Pulsing is accomplished by adding water to the filter at a rate higher than the desired average rate for a predetermined increment of time, and then reducing the rate at which water is added to the filter to a rate lower than the desired average rate for the next increment of time. During steady-state operation, the differences between the higher rate and the desired average rate and between the lower rate and the desired average rate are equal. However, these pulses also may be adjusted to either add to or subtract from the amount of water presently needed.

The water added to the filter is used to rinse the gypsum filter cake, and is introduced to the attack tank as recycle acid. For a given concentration of phosacid in the attack tank, historic data relating to the amount of rinse water typically added to the filter and the amount of water typically added to the attack tank, are known to the operator. Based on this known historical data and known attack tank and filtration operating conditions, the operation of the filtration unit and the attack tank is controlled to maintain the phosacid concentration in the attack tank at its optimum level.

BRIEF DESCRIPTION OF THE DRAWINGS

FIG. 6 illustrates the flow rates for the wash water feed to the filter and the recycle acid flow rate to the attack tank for the same unit.

DETAILED DESCRIPTION OF THE INVENTION

Figure 1:
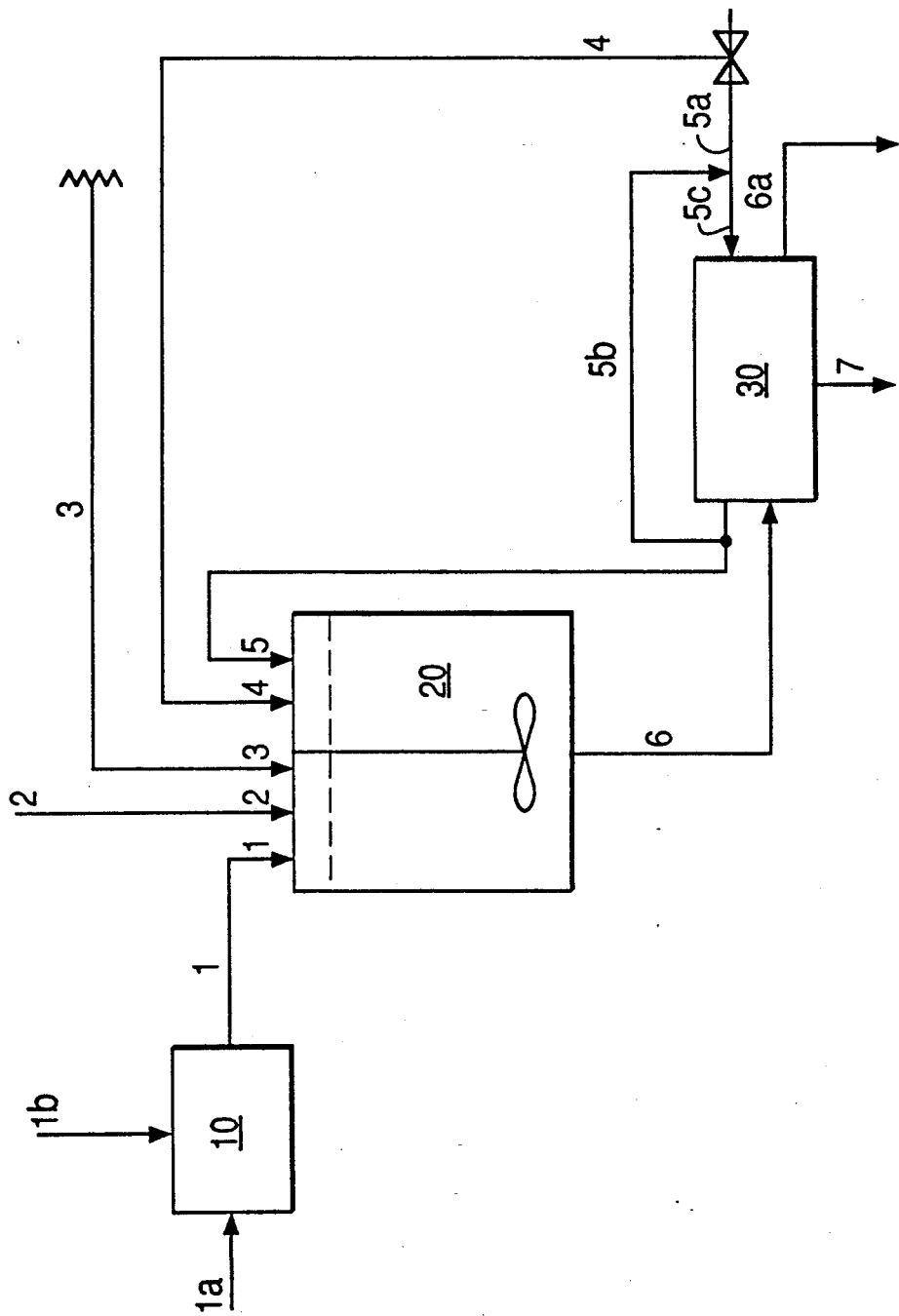
FIG. 1 is a diagrammatic representation of an attack tank, filtration unit, and rock feed unit according to the present invention.

This invention is based on the discovery that by keeping the concentration of phosacid in the attack tank constant, and controlling the filterability of the filter cake, an optimum amount of phosphoric acid can be produced even though the concentration of phosphate ore fed to the attack tank varies.

The reaction that takes place in the attack tank is represented by Equation A above. As the concentration, or amount, of phosphate ore fed to the attack tank varies, the amount of water and sulphuric acid also must be changed to maintain the stoichiometry of Equation A. The amount of water added to the attack tank normally is in excess of the amount required by Equation A. Typically, phosphoric acid is commercially available at 30% $P_2O_5$, and therefore water is added in an amount to achieve this dilution. Also, many phosphoric acid recovery plants utilize evaporators to concentrate product streams.

Skilled practitioners will recognize that for any phosphoric acid recovery system which has been in operation for a period of time, historical operating data exists. Also, data may be available from laboratory (bench-scale) studies. This data will vary among systems, and can be used by skilled practitioners to correlate the amount of rinse water added to the filter and the phosacid concentration in the attack tank with the concentration of phosphate ore in the feed stream and the concentration of phosphoric acid produced. When the concentration of phosphate ore fed to the attack tank varies, the amount of water pulsed to the filter in accordance with the method of the invention is varied to ensure an optimum concentration of phosacid in the attack tank, and a maximum recovery of phosphoric acid from the system.

Water is fed to the attack tank through five types of streams, or sources. The actual number of streams is, of course, not limited. One stream is comprised of a slurry comprising phosphate-containing rock and water. A second stream comprises an aqueous sulphuric acid solution. A third source represents other sources of water, e.g., a recycle stream from outside the attack tank and filtration unit system. Such streams may comprise any water concentration. Skilled practitioners can determine the water concentration in such streams. A fourth type of stream is the direct addition of water to the attack tank. For example, a bypass line is utilized around the filter to introduce water directly to the attack tank when the attack tank needs additional water but the filtration unit does not. The fifth source of water is the recycle acid stream from the filter which was used to wash or rinse the filter cake. All other types of streams which may comprise water and are added to the attack tank are considered part of the third type of stream for the purpose of this invention. By monitoring these five types of streams, and controlling the amount of water added to the filter, the amount of water added to the attack tank may be controlled to compensate for the fluctuations in the amount of phosphate ore added to the attack tank.

The amount of water in the first stream comprising the slurry of phosphate-containing rock and water, is not readily controllable. Skilled practitioners recognize that the slurry water content must be controlled to provide a slurry capable of flowing through a pipe. The amount of water in the third source of water, e.g., a recycle stream from outside the attack tank and filtration system also is not readily controllable. Also, the amount of water added to the second stream to dilute the concentrated sulphuric acid is minimal, and is not large enough to control the quantity of water in attack tank 20. Although the water concentration in this stream can be controlled, typically it is not controlled. Rather, the two streams which are preferably controlled according to the present invention are the recycle acid stream which was used to rinse the filter cake, and the filter by-pass line.

Consider the following examples of a typical operating scenario describing production of phosacid in the attack tank. If the concentration of phosacid in the attack tank is high, the amount of calcium sulphate crystals and phosphoric acid in the attack tank effluent also is high. To lower the concentration of phosacid, more water must be added to the attack tank. However, the high concentration of phosacid and sulphate crystals produces a filter cake which is highly viscous and makes filtering the cake difficult. Skilled practitioners recognize that less water passes through such a viscous filter cake, and consequently, less water is added to the attack tank by way of the recycle acid stream. Rather, the water is retained in the filter and discarded with the filter cake, even though water had been added to the filter with the intention of reducing the concentration of phosacid in the attack tank effluent.

Similarly, if the concentration of phosacid in the attack tank is low, the low amount of calcium sulphate crystals and the low phosacid concentration in the attack tank effluent would provide a filter cake having a lower viscosity. The filter cake therefore would be easier to filter, and would permit more rinse water to pass through the filter cake. Nearly the entire amount of water added to the filter will be passed through the filter cake, and consequently, to the attack tank. Such an operation represents ideal conditions about the filter because the amount of water added to the attack tank can be determined directly, (i.e., smaller amounts, and therefore lower total fluctuation of the amount of water entrained in the filter cake). However, a reduction in water flow rate is required to raise the concentration of phosacid in the attack tank to the optimum value even though the amount of water required at the filter does not need to be adjusted.

Continuing with the examples, as the rinse water supplied to the filter cake is decreased, and consequently less water is being added to the attack tank through the recycle acid stream, the concentration of phosacid in the attack tank increases. However, as the concentration of phosacid increases in the attack tank, more water is needed to rinse the excess phosacid remaining in the gypsum filter cake.

These examples illustrate the complex relationship between the attack tank and the filtration unit. This relationship requires carefully controlled operation to maintain the optimum concentration of phosacid in the attack tank, the optimum filter conditions (i.e., those conditions which permit most of the rinse water added to the filter to pass through the filter cake and into the recycle acid stream), and the maximum recovery of phosacid.

In accordance with the method, the required control is achieved by implementing an on-line computer which operates primarily on a feedback principle. However, unlike common feedback control systems, the set point (desired operation point) varies during operation. The method of the invention accommodates these variations and adjusts operating conditions to maintain optimum phosacid concentration.

Figure 2:
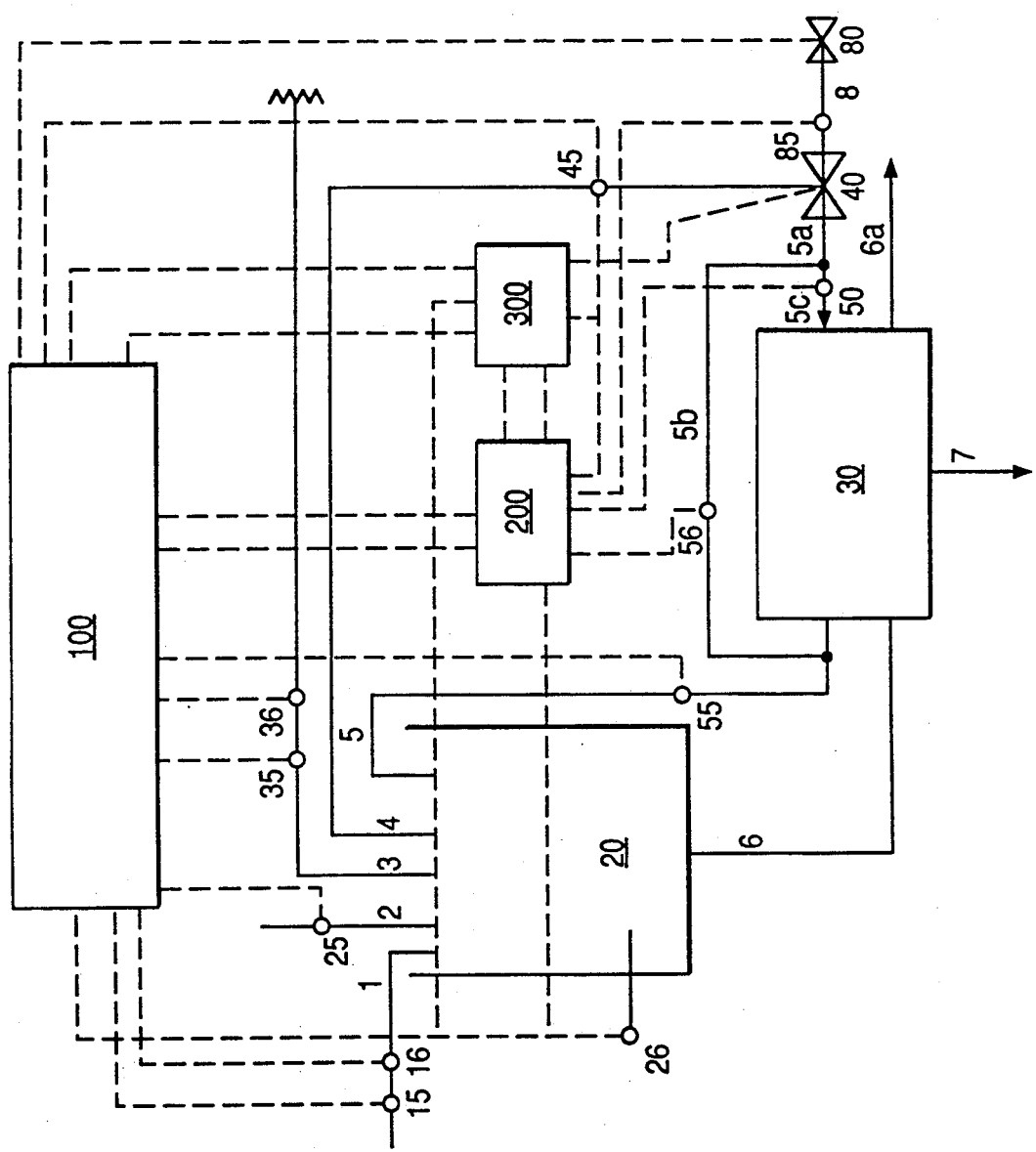
FIG. 2 is a diagrammatic representation of on-line computer control of an attack tank and filter according to the present invention.

Referring now to FIGS. 1 and 2, the desired concentration of phosacid in attack tank 20 is dependent on the concentration of phosphate ore in feed stream 1. Because the concentration of phosphate ore affects the concentration of phosacid and concentration of sulphate crystals in attack tank 20, the amount of phosphate ore fed to attack tank 20 also affects the filterability of the reaction slurry exiting attack tank 20 through stream 6. The filterability of the reaction slurry and the concentration of phosacid in attack tank 20 affect the amount of water used to rinse the filter cake entering the countercurrent filter cake rinse unit ("filter") 30 through line 5c. Thus, the control method of the invention constantly updates the set points for the amount of water added to filter 30 and hence, to attack tank 20 through recycle acid stream 5 to maintain a constant optimum concentration of phosacid in attack tank 20, optimum filtration conditions about filter 30, and achieve the maximum recovery of product phosphoric acid.

Phosphate-containing rock is fed to attack tank 20 through line 1a, and typically is crushed or milled in rock feed unit 10. Water is added to the rock through line 1b to form a feed stream comprising a slurry of wet rock. The wet rock slurry is fed to attack tank 20 through line 1. Water and sulphuric acid are fed to attack tank 20 through line 2. Water also can be fed to attack tank 20 through line 4 which represents a filter by-pass line. A stream representing, e.g., a recycle circuit originating outside the system, can provide water through line 3. Finally, additional water is fed to attack tank 20 through line 5, which is the recycle acid stream from filter 30. Attack tank effluent is fed to filter 30 through line 6. Substantially fresh water, and a stream split from recycle acid water stream 5, lines 5a and 5b respectively, are combined into stream 5c and are passed counter-current to the attack tank effluent. The phrase "substantially fresh water" means that the stream comprises mostly water with minimal amounts of impurities including phosphoric acid.

The filter cake discharge is removed through line 6a for further treatment, and phosphoric acid product stream 7 is subjected to further processing in accordance with methods known to skilled practitioners. As mentioned above, the concentration of phosphoric acid in product stream 7 typically is about 30%. Skilled practitioners recognize that this concentration may vary and that such a change in product phosphoric acid concentration may be achieved by varying the concentration of phosacid in attack tank 20. Skilled practitioners also recognize that water streams 4 and 5b may be comprised of fresh water, water and minor amounts of phosphoric acid from recycle streams outside attack tank 20 and filter 30, or other water sources, so long as the concentration of water in such streams is known.

FIG. 2 represents schematically the control system used in accordance with the method of the invention. Central processing unit 100 represents an on-line computer which controls the overall system. Filter 30 is controlled by the filter control unit 200, and by-pass line 4 is controlled by by-pass control unit 300. Throughout the specification and claims, the phrases "filter control unit" and "by-pass control unit" encompass any method for controlling filter 30 and by-pass line 4. Various control mechanisms can be used such as subprograms, separate terminals interfaced with computer 100, or separate on-line computers. However, both filter control unit 200 and by-pass control unit 300 are interfaced with computer 100.

Continuous measurements are carried out on all processing streams wherein the flow rates of the feed streams 1–5 to attack tank 20 are measured by flow measuring devices, or flowmeters, 15, 25, 35, 45, and 55 respectively, and the flow rates are fed to computer 100. The specific gravity of the rock feed stream 1 is measured by densitometer 16, and fed to computer 100, and the specific gravity of stream 3 is measured by densitometer 36. The specific gravity and flow rate values are used in a manner known to skilled practitioners to determine the mass flow rate of feed phosphate in stream 1, and feed water through stream 3. The concentration of phosacid in attack tank 20 is manually determined by random sampling at sampling spigot 26. These values all are input to computer 100.

Attack tank 20 may be comprised of multiple reactor tanks integrally connected and having weirs on both the bottom and the top of each tank. For example, reactants may flow from the bottom of one tank to the top of the subsequent tank to provide for agitation of the reaction solution. The multiple reactor tanks also may be designed in a maze-type configuration consisting of baffles where the reactants flow throughout the maze. Agitators also may be present to further mix the reactants. Evaporative cooling apparatus also may be present to cool the reaction mixture. Skilled practitioners recognize that other types of reactors may be utilized, and that the water additions from the five stream types may be implemented at various stages throughout the multiple stage reactor.

Filter 30 is controlled by filter control unit 200. Control is achieved by continuously monitoring the flow rates of rinse water and recycle acid streams at flowmeters 50 and 55, respectively, as well as the concentration of phosacid attack tank 20 at sampling spigot 26. The amount of water added to filter 30 then can be adjusted by control unit 200 depending on the amount of water which passes through filter 30.

The quantity of water retained by the filter cake (i.e., the moisture content) is influenced by the crystallization characteristics of the gypsum, the concentration of phosacid in the reaction slurry effluent, the vacuum of the filter, cake thickness, and filter speed. The moisture content may be 20–25% for easily filterable crystals or may be up to 50% for difficult filtrations. Easily filterable crystals are present when the concentration of phosacid in attack tank 20 is low, and crystals are difficult to filter when the phosacid concentration is high. A typical phosphoric acid recovery system would result in a filter cake moisture content having a range of about 25% to about 33%. Knowledge of the amount of moisture in the filter enables the control mechanism of the present invention to determine the amount of rinse water added to filter 30 which passes through the filter to recycle stream 5.

Controlling filter 30 in such a manner provides a relatively constant moisture content in the filter cake discharge. By controlling filter 30 in this manner, it can be determined if the additional water added to the filter actually increases the flow rate of recycle acid stream 5 and hence, increases the amount of water added to attack tank 20. If additional water is needed to control the phosacid concentration in attack tank 20, but cannot be added to filter 30 due to the filter's inability to accept more water, by-pass line 4 may be activated by way of by-pass control unit 300 opening valve 40. The flow rate of by-pass line 4 is measured at flow meter 45 and is fed to both filter control unit 200 and by-pass control unit 300 when the operator inputs the actual phosacid concentration after withdrawing the sample from sample spigot 26. The concentration of phosacid in attack tank 20 also is fed to by-pass control unit 300 at 26. By ensuring interaction between filter control unit 200, by-pass control unit 300, and computer 100, the maximum amount of phosphoric acid can be produced while maintaining the concentration of phosacid in attack tank 20 constant and the moisture content of filter cake from filter 30 relatively constant, even though the concentration of phosphate ore in feed stream 1 varies.

The rinse water added to filter 30 is pulsed in fixed time increments. Any period is suitable if it affords the opportunity to obtain meaningful information. The period used depends on the capacity of the system as well as the production rates, and is set at a time sufficient to see a change in the flow rates of the streams about filter 30. For purposes of example only, and not limitation, 10 minute increments typically are sufficient.

The lower limit of the size of the pulse is related to the capacity of the system and is based on empirically determined detection limits for the flow measurement devices in use. Skilled practitioners recognize that the size of the pulse can be adjusted, depending on the flow rates of the streams as well as the accuracy of the flow measurement devices. The size of the pulse typically represents a minor amount, for example, up to about 5%, and more typically up to about 3%, of the overall flow rate of the rinse water stream. For purposes of example only, and not limitation, a pulse size which can be detected by typical flow meters may be 30 gal/min. Thus, for example, if the desired average flow rate is 1,000 gal/min, pulsing can be carried out by adding water to filter 30 at a rate of 1030 gal/min for ten minutes, and then adding water to the filter 30 at rate of 970 gal/min for the next ten minutes. Thus, the desired average rate of 1,000 gal/min is obtained. If more sensitive flow meters were utilized, the size of the typical pulse could be smaller, whereas if the phosphoric acid recovery system could more readily adjust to larger changes in flow rates of water, the size of the pulse used would be larger. The upper limit on pulse size is established by stability of the system, i.e., the system should not be subjected to a pulse having a magnitude which exceeds the ability of the system to accommodate the pulse. With the guidelines provided herein, skilled practitioners will be able to determine suitable pulse sizes depending on the particular phosphoric recovery system and the accuracy of the measuring devices.

With reference to FIG. 6, it can be seen how water preferably is pulsed to the filter. Each essentially horizontal line of the water to filter flow rate represents the time increment used in pulsing the water (10 minutes). It also can be seen that increases in the water rate addition are implemented on up pulses, and decreases in the water rate addition are implemented on down pulses.

The amount of water passing through filter 30 can be determined by calculating the integrated differences between two consecutive water pulses added through line 8. For example, if water is added to filter 30 at a rate of 1260 gal/min for ten minutes, and then at a rate of 1200 gal/min for the next ten minutes, the difference over each of the two ten minute intervals is 600 gal. For the same two ten minute intervals, if the flow rates of recycle acid stream 5, measured at flowmeter 55, are 1555 gal/min and 1500 gal/min, respectively, the difference between these values would be 550 gal for each 10 minute period. Thus, the fraction of additional water which passed through filter 30 during the 20 minute interval is 550/600, or 92%. The integrity of these calculations can only be assured if the moisture content of the filter cake discharge is kept relatively constant. Skilled practitioners realize that for other phosphoric acid recovery systems, the change in flow rate of water pulsed to the filter may vary depending on the operating conditions of the system.

When less than the desired percentage of water passes through the filter cake and hence too much water is entrained in the gypsum filter cake, a failure count is generated by the control system of the invention. Too much water is entrained in the gypsum filter cake when the moisture content of the cake is too high, and the filter is "dumping wet", (i.e., moisture content greater than about 35%). In the example described above, 92% of the water passed through the filter. This would be considered a successful pulse.

The highest percentage of water which may pass through the filter is, of course, 100%. This would represent an ideal situation where all of the water that was fed to the filter rinsed the filter cake and passed through completely. As the filterability of the filter decreases (i.e., the ability of filter 30 to accept more water decreases), a decreased percentage of water would be expected to pass through filter 30.

Skilled practitioners recognize that the design of some filters 30 is such that a vacuum created in one stage of filter 30 may entirely drain the holding tank at that stage, and thus when water is added to filter 30, it first fills the drained tank before any water is realized in recycle acid stream 5. Thus, in such a situation, even if no water passed through the filter 30, it still may be determined a successful water pulse, in spite of the delay of filling the drained tank. In other words, even though an insufficient amount of water passed through filter 30 during that filter pulse, the filter pulse would still be considered a success. This commonly is referred to as discounting a failed filter pulse. Skilled practitioners realize that various designs of filters have various delay times, and can determine, based on the design of the filter 30 and together with the guidelines set forth herein, what fraction of water passing through filter 30 would be considered a success.

Failure counts can be accumulated by the following formula:

$$FAILCK = F1 * FAILCK + \text{Pulse Indicator} \qquad 1$$

where FAILCK represents a failure count, and Pulse Indicator is equal to 1.0 in the event of a failure and 0.0 if the pulse is determined to be successful. F1 in Equation 1 is used to limit the value of the failure count variable typically to within the range of 0 to 10, and is typically a value between 0 and 1.0. FAILCK is not likely to exceed 10 because other adjustments described below will adjust other parameters as FAILCK increases. Typically, these adjustments will preclude FAILCK from exceeding 10. F1 also is used to determine the speed of recovery from failed filter pulses. If F1 is small, (i.e., about 0.3), the speed of recovery would be slower, whereas if F1 is larger, the speed of recovery would be higher. A typical value for F1 is about 0.9. Skilled practitioners realize that F1 may vary depending on the particular phosphoric recovery system used.

A value of zero for the variable FAILCK would represent a situation where every pulse was successful, and is extremely rare under everyday operating conditions of a phosphoric acid recovery plant. The other extreme, 10, represents the situation where the pulse through filter 30 failed every time, and would result in poor water balance calculations. In fact, as FAILCK approaches the upper limit of 10, the integrity of the accuracy of the water balance decreases sharply. In order to prevent this from happening, the previous failure count (FAILCK) is multiplied by the variable F1. A FAILCK value in the range of 2–4 is good, and a value of 5 represents the situation where every other pulse fails.

Pulse failures are used to calculate the maximum amount of water that may be added through line 8 to filter 30 on the next incremental water pulse according to the following formula:

$$\text{MAXUP} = [(\text{MAXFLOW} - \text{Set Point})/F]/(1 + \text{FAILCK}) \qquad 2$$

where Set Point is equal to the current desired filter water set point. Set Point is based on known filter operating conditions and the concentration of phosphate ore in feed stream 1. MAXFLOW is established slightly above an empirically determined maximum flow rate for filter rinse flow of stream 5c, based on the particular design of the filter and the concentration of phosacid and sulphate in the attack tank 20 effluent stream 6. A skilled practitioner will be able to determine this value for a particular filtration unit.

The difference between MAXFLOW and Set Point is divided by F, a tuning constant empirically determined by the filtering operability. This division ensures that the rate of water added to filter 30 is not excessive. Skilled artisans realize that this value may be different and can be varied for other filtration units depending upon the particular conditions of the phosphoric acid recovery system. A suitable value for F is about 4.

The flow rates of the five sources of water fed to attack tank 20 are integrated by multiplying their respective flow rates by the amount of time elapsed since the last measurement was calculated by computer 100. The respective integrated values then are added together to obtain a totalized flow of the streams. Skilled artisans recognize this form of measurement as variable interval time slicing. The interval is considered variable because the time since the last measurement need not be fixed. Skilled practitioners also recognize that other means of integrating the flow of the streams may be utilized such as constant interval time slicing commonly used in direct integration techniques. The flow rates of the five stream types are measured at flow meters 15, 25, 35, 45, and 55, respectively.

Due to the control of filter 30, the amount of water which passes through filter 30, and into recycle acid stream 5 can accurately be determined. This amount of water then is used in subsequent calculations as the amount of water in recycle acid stream 5. Recycle acid stream 5, and filter by-pass stream 4 typically are assumed to have a very low impurity content, and are assumed to comprise only water and minor amounts of other compounds. Aqueous dilute sulphuric acid stream 2 is fed to attack tank 20. Normally, concentrated sulphuric acid is diluted with water before feeding to attack tank 20. Thus, these streams can be totalized directly through flow meters 25, 45, and 55. Stream 3 can have any water concentration and any impurities which do not interfere with phosacid recovery. Typically, the water is assumed to have a constant impurity content. For example, recycle circuit stream 3 can comprise 92% water. Totalizing water source stream 3 comprising 92% water is carried out by multiplying the integrated totalized flow rate of stream 3 (calculated by integrating the flow rate measured at flowmeter 35 and summed by computer 100) by the fraction of water, namely 0.92. Skilled practitioners recognize that other streams may be used which comprise a different concentration of water.

Another water source stream is phosphate ore slurry feed stream 1, which has a variable concentration of phosphate ore. Because the amount of water added to rock feed unit 10 through line 1b is constant, the concentration of water in slurry feed stream 1 is variable. By monitoring the density and volumetric flow rate of the slurry feed stream at flow meter 15 and densitometer 16 respectively, the dry tonnage flow rate of phosphate ore can be determined. The water flow rate of rock slurry feed stream 1 then can be calculated by subtracting the dry tonnage rate of ore from the overall rate of the stream. Accordingly, stream 1 also can be totalized by multiplying the integrated flow rate by the percentage of water in the stream.

The total water addition to attack tank 20 is simply the sum of the totalized flows of the five water source feed streams 1-5. This total water addition is compared to a theoretical or desired total water addition based on the amount of phosphate ore in feed stream 1, and the desired concentration of phosacid in attack tank 20. The theoretical or desired total water addition to attack tank 20 can be calculated based on the amount of ore fed to attack tank 20 by the following equation:

$$\text{Desired Water} = \text{Dry Tonnage} * \text{Water Ratio} \qquad 3$$

where Dry Tonnage is the dry tonnage flow rate of phosphate fed to attack tank 20. Water Ratio represents the amount of water needed at attack tank 20 per amount of dry ton of phosphate-containing rock fed to attack tank 20. Water Ratio is an empirically determined variable based on historical data and the desired concentration of phosacid in attack tank 20. Typical values for Water Ratio range from about 6 to about 8 gal/min/ton/hr. Thus, for phosphate ore of typical phosphate concentration, about 350 to about 500 gallons of water are required per ton of rock fed to attack tank 20. Skilled practitioners realize that the value of Water Ratio depends on the capacity of the system, the concentration of phosacid in attack tank 20, and the production rate of phosphoric acid. The value of Water Ratio depends on the particular phosphoric acid recovery system.

The desired water addition rate, i.e., Desired Water in Equation 3, then can be totalized in the same manner as the other water feed streams. Periodically, e.g., hourly (or whatever period found to be sufficient), an operator may take a sample from attack tank 20 at sampling spigot 26, filter the sample, and analyze the sample filtrate to analytically determine the phosacid concentration. The operator enters this new phosacid concentration into computer 100, and the six totalized streams (i.e., the five water streams and the Desired Water calculated in Equation 3), will be reset to zero.

The amount of water needed to adjust attack tank 20 to the target concentration of phosacid can be calculated by the following:

$$\text{CALC H2O} = (\text{Sample} - \text{Target}) * A1 \qquad 4$$

CALC H2O represents the amount of water needed to adjust the volume of attack tank 20 to achieve the target concentration. Sample is the concentration of phosacid in attack tank 20 as measured by the operator, and Target is the desired theoretical optimum concentration. CALC H2O is negative if the sample analysis entered by the operator has a lower phosacid concentration than the target concentration. A negative value for CALC H2O therefore indicates that too much water has been added to attack tank 20. Of course, it follows that if Sample is greater than Target, then CALC H2O will be positive indicating that not enough water has been added to attack tank 20.

A1 in Equation 4 represents the amount of water needed to adjust the concentration of phosacid in attack tank 20 by 1%. Skilled practitioners can calculate the value of A1 for any particular attack tank.

The amount of water to be added to or subtracted from the total water introduced to attack tank 20 (depending on whether CALC H2O is positive or negative) now can be adjusted by comparing the previous value of CALC H2O (i.e., last CALC H2O) with the actual water addition during the last sampling period. In other words, the control system of the method of the invention adjusts the amount of water introduced to attack tank 20 by determining whether the amount of water needed to maintain the phosacid concentration in attack tank 20 actually was introduced. Thus, the difference between the desired amount of water (Total Desired) and the actual water addition (Total Added) during the last sampling period can be calculated from the following formula:

$$\text{WATERR} = \text{Total Desired} - \text{Total Added} + \text{last CALC H2O} \qquad 5$$

where WATERR is the error which represents the difference between the desired and the actual water addition. WATERR approaches zero in ideal conditions. Total Desired represents the totalized amount of water required to maintain the concentration of phosacid in attack tank 20. Thus, Total Desired is the totalized Desired Water variable calculated by integrating and totalizing the Desired Water variable in Equation 3 above. The Total Added variable is the totalized amount of water actually added to attack tank as determined by integrating and totalizing the flow rate of the streams measured by flow meters 15, 25, 35, 45 and 55.

The Water Ratio for the next sampling period then can be updated by the following formula:

$$\text{Water Ratio} = \text{Water Ratio} + [(\text{CALC H2O} - \text{WATERR})/\text{TROCK}]/N \qquad 6$$

where TROCK is the totalized amount of dry tons of rock entering the system through stream 1 during the last sampling period as measured at 15 and 16. The Water Ratio variable then is updated by comparing WATERR of Equation 5 to CALC H2O from Equation 4 above. Using the updated Water Ratio variable, the Desired Water can be adjusted accordingly by feeding the updated Water Ratio to computer 100.

The divisor N in Equation 6 creates a rolling average of the last N samples of the Water Ratio. Typically, N is about 5. Skilled practitioners recognize that any value may be utilized.

The amount of water adjustment required to bring the system back to the control or target phosacid concentration (i.e., CALC H2O in Equation 4 above) preferably is not implemented instantaneously. Rather, the present invention utilizes a time function adjustment with a time constant to gradually increase or decrease the total water flow rate. This time function preferably is calculated by the following control equation:

$$\text{TF} = \exp(-dt/T) \qquad 7$$

where TF is the time function and dt represents the period in minutes since the last entry of sample analysis data. T is the time constant. A time constant of about 40 percent of the sampling interval is suitable. In other words, if the operator desires to add about 90% of the water necessary to achieve the desired phosacid concentration in one sampling interval (e.g., 60 minutes as exemplified herein), and approximately 100% is to be added in two sampling intervals, then a time constant of 24 minutes would be required to add all of the water necessary to bring the concentration of phosacid in attack tank 20 to its desired value within 5 time constants. Skilled practitioners recognize that it is preferred to add the water required to achieve the desired phosacid concentration in two sampling intervals. Skilled practitioners recognize that other time constants may be used depending on the sampling rate, the time increments in which the water is pulsed to filter 30, as well as the desired average rate at which water is added to filter 30.

The time function variable preferably is limited to a maximum value of TFMAX by the following control equation:

$$\text{if TF} > \text{TFMAX then TF} = \text{TFMAX} \qquad 8$$

Limiting the time function variable in this manner will permit the control method to gradually feed the amount of water adjustment required (CALC H2O from equation 4) to achieve the desired phosacid concentration to attack tank 20. Skilled practitioners realize that the entire amount of water required may exceed the operating limitations of filter 30, or because the filter cake will not be adequately rinsed, and product phosphoric acid will be lost. Thus, the amount of water added to filter 30 preferably is added gradually.

The inventors prefer to limit TF to values less than 0.70, and more preferably to 0.65. Thus, TFMAX preferably is 0.70, and more preferably is 0.65. Skilled practitioners recognize that the time function may be limited by values other than these, depending on the capacity of the system and filter operating conditions. For example, in particular phosphoric acid recovery plant having a filter 30 which could accommodate large water fluctuations, adjustments to water flow rate may be implemented more rapidly. Thus, the time function may be limited by a value smaller than 0.65. Also, the value of T, the time constant in Equation 7, may affect the rate at which water is added to filter 30. Smaller time constants would result in the gradual addition of water to filter 30 at a faster rate than larger time constants. Skilled practitioners recognize that the adjustments to the water added to filter 30 also may be added by a ramping function, or other means of adjustment, rather than an exponential adjustment.

The actual water adjustment required to compensate for an off-target phosacid concentration in attack tank 20 can be calculated from the following equation:

$$\text{TANK ADJ} = \text{CALC H2O} * (1 - \text{TF}) \qquad 9$$

where TANK ADJ is a fraction of the water adjustment required to bring the attack tank back to the control or desired phosacid concentration.

As set forth in equations 1–9, when new analysis data is entered into the computer, the largest instantaneous error for filter 30 control is (1-TFMAX) of the total calculated water requirement CALC H2O. For example, if TFMAX equals 0.65 the largest instantaneous error is 35% of CALC H2O. The remaining water adjustment then can be added gradually over time by slowly increasing the percentage of the last sample error, and filter 30 control Equation 9 will gradually increase the amount of water added through stream 5c. It is important to note that if too much water is added to filter 30 directly through stream 5a, the desired amount of water may not pass to attack tank 20 through recycle acid stream 5. Rather, it may be discharged with the filter cake due to the filter's inability to accept more water. This in turn will affect the phosacid concentration in attack tank 20. Therefore, by-pass line 4 is utilized to add water directly to attack tank 20 and to by-pass filter 30 in these situations. By-pass line 4 can be activated by opening and closing valve 40 which will permit some of the water required to directly pass to attack tank 20 through line 4, and avoid filter 30 from "dumping wet" (i.e., the moisture content of the filter cake discharge is too high).

The control system programs utilized in the invention control the amount of water pulsed to the filter according to the water adjustment equations described above. However, as described in equations 1 and 2 above, the filter operability must be controlled to prevent too much water from being added to filter 30 (limited by MAXUP of Equation 2), and not enough water from passing through filter 30 (represented by FAILCK of Equation 1).

Filter operability is controlled by filter control unit 200 shown in FIG. 2, which is integrated with computer 100. Because the concentration of phosacid and sulphate crystals in attack tank 20 directly affect the filterability of the filter cake, and these are in turn affected by the variable concentration of phosphate ore in the feed stream 1, the desired operability of filter 30 must be adjusted accordingly. Skilled artisans realize that the filterability of filter 30 depends on variables such as the capacity and vacuum of the filter, the rates of filter cake streams through the filter as well as the cake's chemical makeup. Skilled artisans further recognize that these variables may be different for each particular recovery system.

The primary source of water required to maintain the water balance in attack tank 20 comes from the recycle acid stream 5. Fresh water is fed to filter 30 through stream 8. Adjustments for this loop are controlled by filter control unit 200, and by-pass control unit 300, and are based on values obtained by integrating the error between the actual water addition and the theoretical amount needed. The present invention utilizes an integral-derivative control technique to calculate these adjustments to filter rinse water feed stream 8, and can be calculated by the following set of equations:

$$\text{LASTERR} = \text{ERROR} \qquad 10$$

$$\text{TANK ADJ} = \text{CALC H2O} * (1 - \text{TF}) \qquad 11$$

$$\text{ERROR} = \text{ACTUAL} - \text{DESIRED} + \text{TANK ADJ} \qquad 12$$

$$\text{NEXTERR} = \text{ERROR} + \text{PULSE} * \text{INC} \qquad 13$$

if last CALC H2O = CALC H2O then
$$\text{LASTERR} = \text{NEXTERR} \qquad 14$$

$$\text{last CALC H2O} = \text{CALC H2O} \qquad 15$$

$$\text{NEXT ADJ} = \text{NEXTERR}/\text{I} - (\text{LASTERR} - \text{NEXTERR})/\text{D} \qquad 16$$

if PULSE*NEXT ADJ < 0 then NEXT ADJ = 0 \qquad 17 if NEXT ADJ > MAXUP then NEXT ADJ = MAXUP \qquad 18 if NEXT ADJ < NEGMAX then NEXT ADJ = NEGMAX \qquad 19

Equations 10–19 are run prior to every change in pulse, i.e., every period the water is pulsed. As exemplified herein, this increment of time is 10 minutes.

ACTUAL in Equation 12 is the totalized actual water feed rate calculated from the water balance around attack tank 20, and DESIRED is the totalized theoretical desired amount of water based on the desired concentration of phosacid in attack tank 20 and the concentration of feed phosphate ore. TANK ADJ is defined in equation 9 above, and PULSE is the magnitude of the next filter pulse. PULSE is positive if the pulse is an up pulse, and negative if the pulse is a down pulse.

NEXT ADJ is the amount of water added to filter 30 on the next pulse. NEXT ADJ may be either negative or positive, depending upon whether more or less water is needed to stabilize the phosacid concentration in attack tank 20. PULSE is multiplied in Equation 13 by INC, the length of the pulse, to integrate the flow rate of water added to filter 30 over the selected increment. In particular, INC equals 10 for a 10-minute interval. Equation 17 is designed so that decreases in the amount of water added to filter 30 are added only on down pulses (i.e., both PULSE and NEXT ADJ are negative), and increases on up pulses.

ERROR represents the current error in the system, that is, the current error in the water balance. LASTERR represents the error from the previous pulse, and NEXTERR represents the predicted error for the next pulse. NEXTERR is calculated according to Equation 13. Therefore, LASTERR represents the ERROR 10 minutes ago, ERROR represents the ERROR now, the NEXTERR represents the predicted ERROR 10 minutes from now. The value NEXTERR/I in Equation 16 represents the integral portion of the control system about filter 30, and represents the magnitude of the ERROR. The value of (LASTERR−NEXTERR)/D represents the derivative portion of control, and represents the rate of change of the magnitude of the ERROR. Note that the derivative portion of the ERROR represents the rate of change of like pulses, (i.e., LASTERR and NEXTERR represent the ERROR of either two consecutive up pulses, or down pulses). If NEXTERR is equal to 1000, and LASTERR is equal to zero, the NEXT ADJ would be $-40$, indicating that on the next down pulse adjustment made to the water added to filter 30, the rate will be decreased by 40 gal/min.

The values of I and D in Equation 16 above represent integral and derivative tuning constants, respectively. Both the magnitude and the ratio of the constants are important. The magnitude of I and D are selected so that the value of the NEXT ADJ ranges between MAXUP and NEGMAX. Also, the magnitude of I and D are selected to preclude the addition of too much water to the filter at any time interval, and to ensure that the quantity of water added is sufficient to be effective in adjusting the concentration of phosacid in attack tank 20. Typical values for I range from about 30% to about 200% of the amount of water added to filter 30 and defined as NEXT ADJ. The magnitude of D typically ranges from about 6% to about 40% of NEXT ADJ. For purposes of example, I may vary from about 80 to about 120, and D from about 10 to about 30.

The ratio of I and D represents the relative importance, or contribution, of the integral or derivative portion of the control system. The contribution of the derivative portion of the control system of the invention is I/D times as large as the integral portion, as can be seen in Equation 16 above.

Preferably, the contribution of the derivative portion is larger than the contribution of the integral portion of the adjustment because it is more important to follow the rate of change of the magnitude of the ERROR than the magnitude of the ERROR. Skilled practitioners realize the derivative and integral portions of their control system may vary, but a factor of 5 for the value of I/D is preferred.

The control loop set forth in Equations 10 through 19 is a preferred loop. The loop is repeated prior to every filter pulse, and Equation 17 ensures that adjustments which decrease the amount of water added typically are implemented only on the next down pulse. However, by employing different equations, adjustment can be made at anytime in any direction. Such operation is not preferred, however. For example, if the concentration of phosacid in attack tank 20 is low, and less water needs to be added, then no adjustments are made to the filter pulse on the up pulse. However, on down pulses, during the next increment, the amount of water added to filter 30 is decreased. Equation 14 is devised to shield the amount of filter rinse water adjustment represented by NEXT ADJ, and calculated by equation 16, from large changes between existing operating conditions and the new operating conditions input by the operator based on the sample data. If large changes are required, they will be implemented over a period of time due to both Equation 14 and the exponential time function affect on the variable TANK ADJ calculated in Equations 9 and 11.

If the product of PULSE and NEXT ADJ is positive, the calculated adjustment for the additional water requirement will be implemented on that pulse. In addition to the large adjustment limitations on the amount of water which may be added to filter 30 described above, adjustment in the amount of water also is limited by the operability of the filter. Therefore, NEXT ADJ is limited by MAXUP in equation 18 with respect to how much water may be added on the next up pulse, and is limited by NEGMAX in equation 19 with respect to how much water may be decreased on the next down pulse. NEGMAX always is a negative value and represents the maximum amount by which the water addition rate can be decreased for any given time increment. Typically, the magnitude of NEGMAX is between about 3 and 15 percent, and preferably between about 5 and 9 percent, of MAXFLOW. Skilled practitioners recognize that other values may be utilized. Skilled artisans also recognize that the lower limits may vary depending on the filtering conditions, the capacity of the phosphoric acid recovery system, and the flow rates of the process streams.

Decreases in the water added to the filter typically are implemented on down pulses. For example, if the amount of water added to filter 30 is currently set at 1000 gal/min (i.e., pulsed at 1030 gal/min and 970 gal/min), and the water added to filter 30 needs to be decreased to 970 gal/min (NEXT ADJ$=-30$), the water rate will be adjusted to 940 gal/min at the next down pulse and 1000 gal/min at the next up pulse.

At times, the filtering conditions about filter 30 may call for a decrease in the filter rinse water even though the water balance on attack tank 20 calls for an increase in the water addition. Also, as discussed above, Equation 1 is used to generate failure counts when less than the desired percentage of water passed through filter 30. Of course, the greatest percentage of water that can pass through filter 30 is 100%. The following set of equations determines if the flow rate of water to the filter should be adjusted and calculates the adjustment needed:

$$\text{FAIL ADJ} = K^*(\text{FCKMAX} - \text{FAILCK}) \qquad 20$$

$$\text{if FAIL ADJ} > 0 \text{ then FAIL ADJ} = 0 \qquad 21$$

$$\text{if PULSE} < 0 \text{ then NEXT ADJ} = \text{NEXT ADJ} + \text{FAIL ADJ} \qquad 22$$

where FCKMAX represents an upper limit placed on the FAILCK variable calculated in Equation 1 above, typically 4.5. As mentioned above, a FAILCK value of 5 indicates that every other pulse has failed, i.e., did not pass essentially completely through filter 30. Thus, when FAILCK reaches 4.5, the control system of the invention will be warned that the filter is about to fail. When this happens, by-pass line 4 is activated to relieve the filter 30. K in Equation 20 represents a tuning constant particular to the filter utilized. K represents the degree in which water may be decreased from the filter 30. Skilled practitioners realize that this value depends upon the filter utilized, and can be determined by limiting FAIL ADJ to a value where no more than 10% of the maximum capacity of filter 30 is removed in a 60 minute period under extreme failing conditions. Typical values for K range from about 6% to about 15% and preferably range from about 9% to about 11% of the maximum capacity. The value of K most preferably is about 10% of the maximum capacity.

When the filtration variable FAILCK indicates that a decrease in filter flow rate is needed as calculated by equation 1 above, but the water balance calculations on attack tank 20 call for additional water, the result is an increase in the amount of water added on the next up pulse. The overall effect on the flow rate of water to be added to filter 30 is dependent on the magnitude of the variable FAILCK. For example, as FAILCK increases in magnitude indicating that not enough water is passing through filter 30, the maximum allowable amount of water that can be added to filter 30 during each pulse, which is limited by MAXUP, is decreased by operation of Equation 2, even though the amount of water needed at attack tank 20 is increasing.

On the other hand, as FAILCK increases in magnitude, but attack tank 20 requires addition of more water, the decreases in the amount of water added to filter 30 on down pulses grow larger, as calculated by FAIL ADJ in equation 20 above. When the overall water balance on attack tank 20 cannot be maintained by adjustments to the filter flow rate at stream 5c alone, due to the limitations of MAXUP and FAIL ADJ, by-pass water stream 4 is activated by opening valve 40. The flow rate of water through by-pass line 4 is gradually increased to compensate for the additional water needs which cannot be met by recycle acid stream 5 due to the limitations on filter 30.

Filter by-pass line 4 is utilized to prevent accumulation of large deficits in the water balance due to the filter's inability to supply this water, and also to ameliorate application of sudden increases in the water adjustment by way of the filter wash water. By-pass line 4 is controlled by by-pass control unit 300. Under normal operating conditions, by-pass line 4 will permit small amounts of water to be added directly to attack tank 20 while the filter flow rate adjusts to varying conditions in attack tank 20 and phosphate ore concentrations in feed stream 1. Thus, the reliability of the water balance is maintained by preventing large fluctuations in the filter cake discharge moisture content during a sampling period.

Filter by-pass line 4 can be closed at valve 40 when the amount of water required can be satisfied directly by the recycle acid stream 5. Filter by-pass line 4, in practice, is never totally closed. Practitioners recognize that an accumulation of deposits may occur in an idle line and prevent its use when needed. Thus, a minor amount of water (i.e., about 10 gal/min) normally is added to attack tank 20 through by-pass line 4.

By-pass water rate is independent of the filter flow rates, and is not intended solely to maintain the phosacid concentration in the attack tank. Rather, by-pass water is used to prevent the actual phosacid concentration from exceeding the upper control limit of 0.5% above the target. The upper control limit could be exceeded if more water is needed at attack tank 20 to bring the concentration down, but this water could not be added through acid recycle stream 5 due to filtering conditions. An effective control target for the by-pass line can be set at approximately to 0.20% above the phosacid concentration control target. By setting the control target for by-pass line 4 in this manner, when the phosacid concentration is reduced to only about 0.20% above the control target concentration, by-pass line 4 is closed by valve 40. In this way, the long term water balance is prevented from being satisfied with by-pass water when more flow could be added to the filter wash flow rate.

Skilled practitioners recognize that the by-pass control target may be varied depending on the ability of the recycle acid stream to adjust the concentration in attack tank 20, and the filter's ability to accept more water. Therefore, control of filter 30, by-pass line 4, and attack tank 20 in this manner prevents filter 30 from dumping wet and thus permits the desired amount of water to pass through the filter cake 30 while at the same time maintaining the phosacid concentration in attack tank 20 at the desired concentration.

The by-pass control target set point is not constant and is increased on filter down pulses, and can be adjusted manually rather than calculated directly to permit manual adjustment by an operator when necessary. Thus, the operator can by-pass control unit 300 when necessary. Skilled practitioners realize that adequately trained technicians can determine when the filter is not operating properly, and can manually adjust the by-pass control target set forth in computer 100 is required.

Increases in the by-pass set point are based on the present deficit in the water balance, and can be calculated from the difference in the totalized actual and desired water adjustments and the calculated water adjustment from the last sample analysis. Thus, the variable CKBYPASS can be calculated from the following formula:

$$CKBYPASS = ACTUAL - DESIRED + CALC\ H2O \qquad 23$$

where CKBYPASS represents the current deficit in the total water balance, ACTUAL represents the totalized actual amount of water added, DESIRED represents the totalized desired amount of water to be added, and CALC H2O, defined by Equation 4 above, represents the calculated water adjustment necessary to maintain the phosacid concentration in attack tank 20.

The amount the by-pass set point is increased can be represented by the following set of equations:

$$\text{if PULSE} < 0 \text{ then DO} \qquad 24$$

$$SETPASS = SETPASS + (CKBYPASS - R1)/M \qquad 25$$

$$\text{if CKBYPASS} > R2 \text{ then}$$
$$SETPASS = SETPASS + (CKBYPASS - R2)/P \qquad 26$$

$$\text{if CKBYPASS} > R3 \text{ then}$$
$$SETPASS = SETPASS + (CKBYPASS - R3)/P \qquad 27$$

$$\text{if CKBYPASS} > R4 \text{ then}$$
$$SETPASS = SETPASS + (CKBYPASS - R4)/P \qquad 28$$

where SETPASS is equal to the current by-pass set point. Equation 24 enables the program to operate only on down pulses (i.e., when PULSE < 0). The layering effect of equations 25 through 28 opens the by-pass line at larger increments as the deficit in the water balance increases, and as filter 30's ability to accept more water does not increase at the same rate as the deficit in the water balance increases. Thus, if adjustments made to the amount of water added to filter 30 do not make up for the water deficit, by-pass line 4 will compensate by opening valve 40 further and further to gradually add the needed water to attack tank 20.

The values of M, R1, R2, R3, R4, and P all represent tuning constants particular to the volume of attack tank 20, and the degree of control desired for the phosacid concentration in attack tank 20. The values of R1, R2, R3 and R4 are designed to provide a "layering" effect, and typically range in size from R1 to R4. Skilled practitioners realize that control of the by-pass line 4 can be achieved by increasing or decreasing the number of 'layers', or steps, used to gradually open by-pass line 4. For purposes of example, the preferred embodiment of the example described throughout the specification utilizes a 4 tiered layering effect.

The values of R1–R4 typically depend on how far the concentration of phosacid in attack tank 20 is allowed to vary, i.e., a tolerance in phosacid concentration. For purposes of example, the concentration may be allowed to vary 1%. This range then is divided by the number of layers plus one (i.e., 5 in the above example to yield 4 layers) to determine the percentage represented by R1-R4. Thus, according to the above example, R1-R4 would represent the amount of water needed to adjust the concentration of phosacid in attack tank 20 about 0.2%, 0.4%, 0.6% and 0.8%, respectively. Skilled practitioners recognize that if more layers were used, the values would be smaller. Thus, if the volume of attack tank 20 were about 1.0 million gallons, R1 would be about 2,000 gallons, R2 would be about 4,000 gallons, R3 about 6,000 gallons and R4 about 8,000 gallons. Skilled practitioners recognize that the values for R1-R4 may vary depending on the layering desired and the volume of attack tank 20.

The values of P and M depend on the speed of response for activation of by-pass line 4. Skilled practitioners recognize that it is more important to close by-pass line 4 than to open by-pass line 4 because when by-pass line 4 is open, the filter cake may not be adequately rinsed. The magnitude of P and M may vary within the range of from about 200 to about 300 for M, and about 400 to about 600 for P. Preferably, M is equal to about 250 and P is equal to about 500. By using these values for M and P, by-pass line 4 may be more rapidly closed, and the speed at which by-pass line 4 is opened is slow enough to allow filter 30 to recover, while maintaining the desired concentration of phosacid in attack tank 20.

As an example of the layering effect of Equations 24-28, if the water deficit at attack tank 20 is above R2, Equation 26 will be activated which will open valve 40 a predetermined amount to permit an adequate amount of water to feed to attack tank 20 and compensate for the deficit. If the water deficit at attack tank 20 is above R3, Equation 26 first will be activated to open valve 40 its predetermined amount, and then Equation 27 will be activated to open valve 40 even more.

Equation 25 effectively will operate to close by-pass line 4 if the deficit in the water is less than R1. In this situation, the deficit in water could be accounted for by the filter wash water stream 5a which is fed to attack tank 20 through recycle acid stream 5. By-pass line 4 is used only as a safety measure to ensure that enough water is added to the attack tank when needed while at the same time preventing the filter from dumping wet. As an additional safety measure, another control mechanism can be utilized to close by-pass line 4 if the water balance indicates that water flow rates should be reduced. This equation operates on both up and down pulses and is represented by the following:

if CKBYPASS<0 then
  SETPASS=SETPASS+CKBYPASS/M        29

By adequately controlling attack tank 20, filter 30, and by-pass line 4, an optimum concentration of phosacid in attack tank 20 can be maintained, the filterability of filter 30 can be controlled, and a maximum recovery of phosphoric acid can be achieved. The following example demonstrates the superior control achieved according to the control method of the present invention.

EXAMPLE 1

Figure 3:
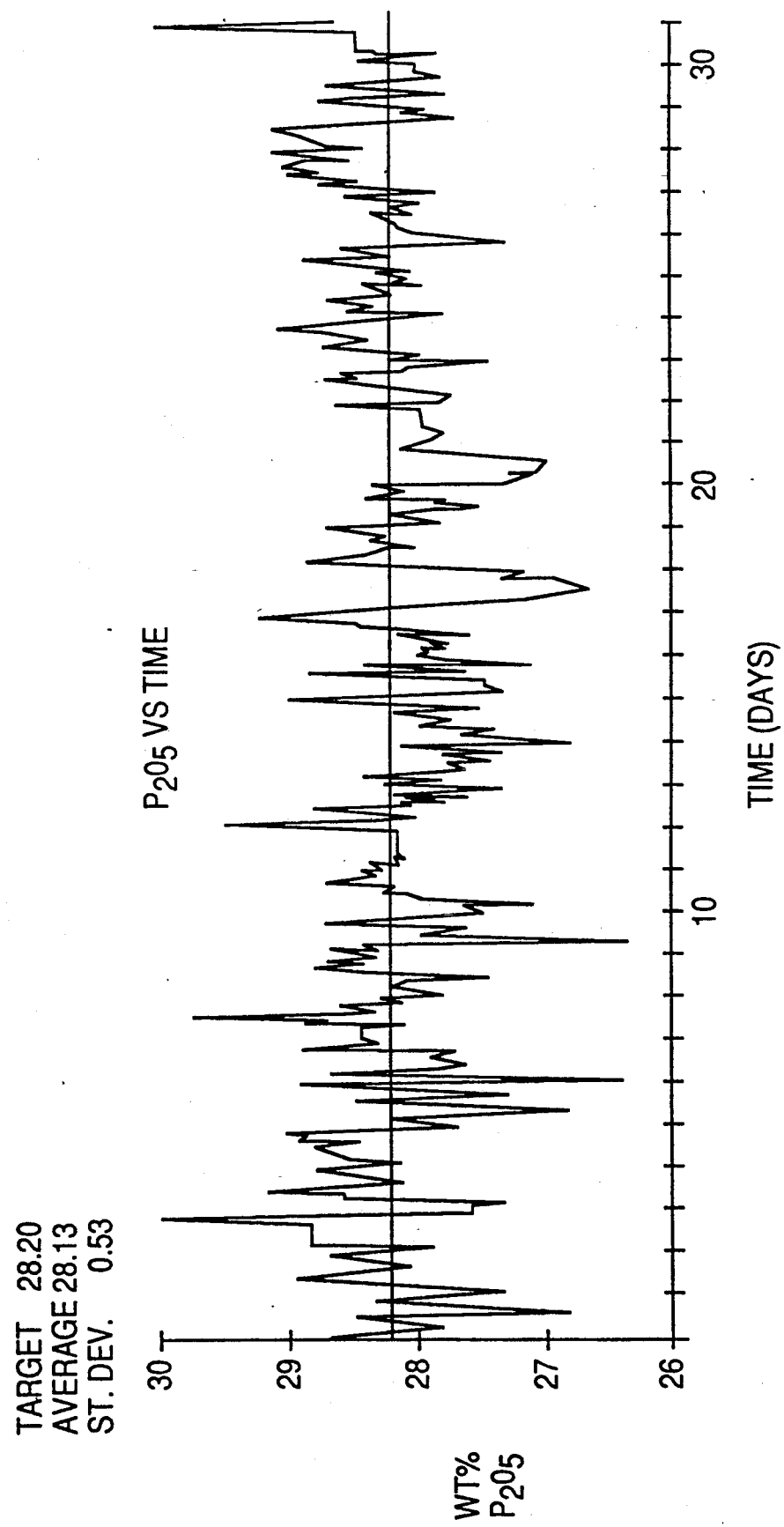
FIG. 3 illustrates a degree of control typically achieved manually in an operating unit over a 30 day period.

A phosphoric acid recovery attack tank of the type shown in FIG. 1, having a capacity of about 1,000,000 gallons, and filter having a maximum filtering capacity of about 3,000 gal/min of reaction slurry, is manually controlled by visually inspecting the moisture content of the filter cake discharge, manually sampling the attack tank, and manually adjusting the amount of water sent to the attack tank through the filter, the by-pass line, or both. The flow rates of the filter rinse water range from about 1,000 to about 1,400 gal/min. The recycle acid stream varies from about 1,200 gal/min to about 1,900 gal/min, the filter feed (i.e., the reaction slurry) is about 2400 to about 2900 gal/min and contains about 35% to about 40% solids. The moisture content of the filter cake discharged from the system varies from about 22% to about 33%. The flow rates of the streams fed to the attack tank are as follows: feed rock slurry, about 950 gal/min; concentrated aqueous sulphuric acid, about 500 gal/min, and is diluted with about 100 gal/min of water; recycle stream 3, originating outside the system, about 125 gal/min; and the flow rate through the filter by-pass line is about 10 gal/min when not activated, and has a maximum capacity of 500 gal/min when needed to introduce water into the attack tank. Typical results which may be achieved over a 30 day period are shown in FIG. 3.

The same representative phosphoric acid recovery attack tank and filter are controlled by the process of the present invention where an on-line computer continuously updates the desired concentration of phosacid in the attack tank, determines the amount of water required to maintain that concentration, adjusts the amount of water sent to the attack tank through the filter, the by-pass line, or both, and controls the moisture content of the filter cake discharge, all in accordance with the claimed invention. Typical results over a 30 day period are shown in FIG. 4.

Figure 5:
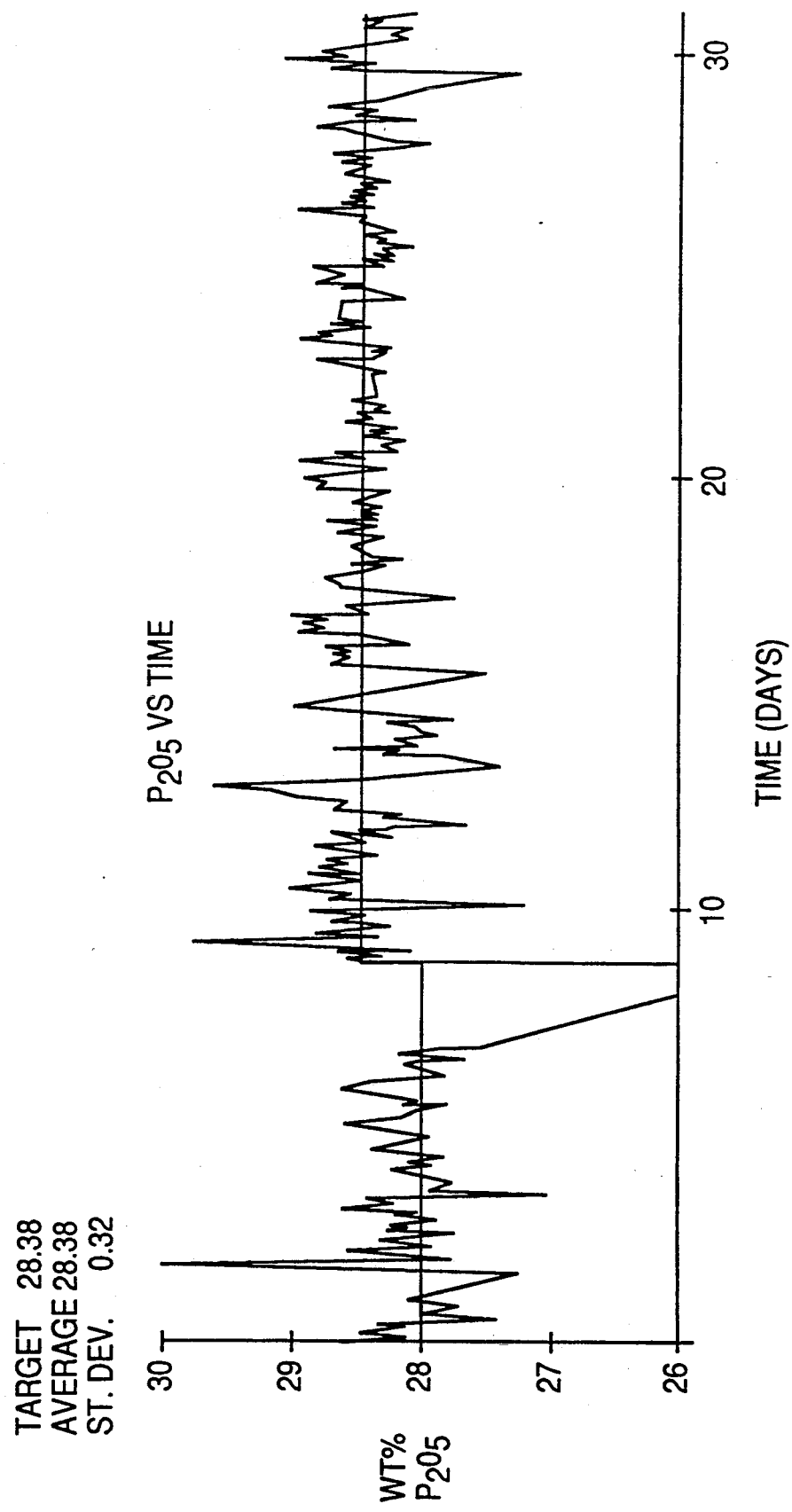
FIG. 5 illustrates a degree of control typically achieved by the method of the present invention in the same unit when the desired concentration of phosacid in the attack tank is changed.

As further evidence of the superior control which can be achieved by the method and apparatus of the present invention, FIG. 5 represents typical control of the same phosphoric acid recovery system in which the phosacid concentration in the attack tank changes from 28% to 28.38%.

FIG. 6 illustrates the pulses fed to the filter of the system described above, and the flow rates of the recycle acid fed to the attack tank. These pulse adjustments are made to the filter, and consequently, to the recycle acid stream, to maintain the concentration of phosacid in the attack tank at a constant rate of about 28% in accordance with the method claimed herein.

Figure 4:
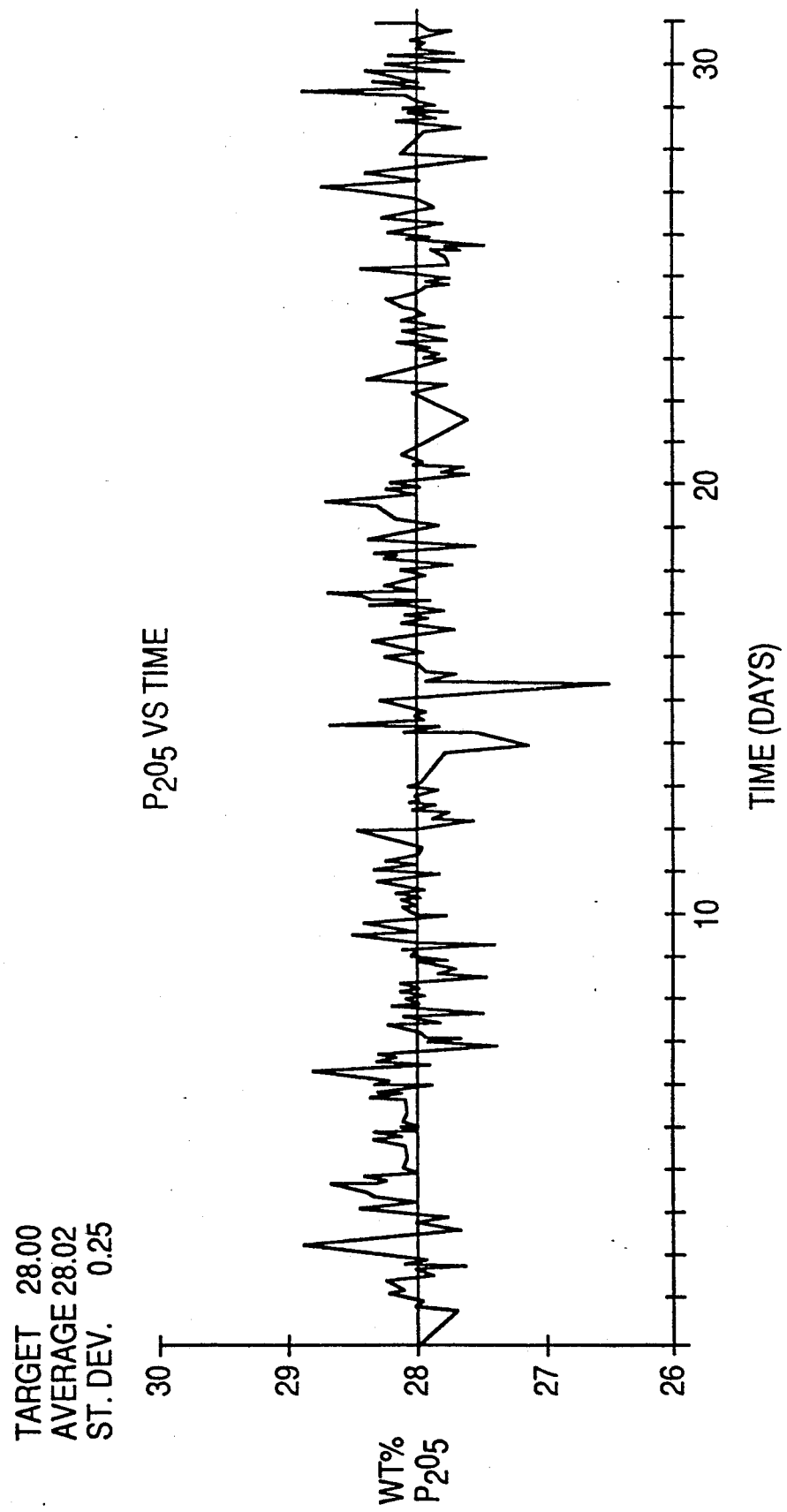
FIG. 4 illustrates a degree of control typically achieved by the method of the present invention over a 30 day period for the same unit.

As can be seen from the above FIGS. 3, 4, and 5, the process of the present invention better controls a phosphoric acid recovery attack tank and filtration unit to maintain maximum phosphoric acid recovery.

While the invention has been described in detail with respect to the examples and preferred embodiments, skilled artisans realize that various modifications may be made to the invention without departing from the spirit and scope thereof.

I claim:

1. A method for controlling the phosphic acid product concentration in a continuous phosphoric acid recovery process comprising:
   (a) supplying phosphate ore in aqueous slurry to an attack tank in which the ore is subjected to attack in an acidic solution containing sulfuric acid and phosphoric acid;
   (b) producing from the attack tank a product slurry comprising an aqueous phosphoric acid solution and calcium sulfate;
   (c) separating the calcium sulfate and aqueous phosphoric acid solution by filtration to form an aqueous phosphoric acid solution and a calcium sulfate filter cake;

(d) rinsing said filter cake with water to recover phosphoric acid therefrom and to form a phosphoric acid solution which is returned to the attack tank;

(e) controlling the quantity of water supplied to the attack tank from the addition of aqueous sulfuric acid, returned phosphoric acid solution, and water added directly to the attack tank, wherein said control comprises:

(i) calculating a theoretical quantity of water which, when added to the attack tank, maximizes the recovery of phosphoric acid;

(ii) controlling the quantity of rinse water to maximize the recovery of the returned phosphoric acid solution from the cake by pulsing the flow rate of the rinse water a plurality of times in a predetermined minor amount relative to the rinse water flow for a predetermined interval to determine the quantity of rinse water required to maximize the recovery of phosphoric acid from the cake;

(iii) measuring the amount of rinse water delivered to the attack tank in the returned phosphoric acid solution; and (iv) adjusting the quantity of water added to the attack tank to achieve addition of the theoretical quantity required in step (e(i)) by controlling the sulfuric acid concentration, the quantity of rinse water from step (e(ii)) and the amount of water delivered to the attack tank measured in step (e(iii)), and the quantity of water added directly to the attack tank.

2. The method as in claim 1, wherein any changes of the flow rate of the quantity of rinse water added to the filter are effected over a period sufficient to preclude the filter from discharging water with the filter cake due to the filter's inability to accept more water.

3. The method as in claim 1, wherein the quantity of rinse water added to the filter to maximize the recovery of the returned phosphoric acid solution is essentially equal to the quantity of the water in the phosphoric acid solution returned to the attack tank.

4. The method as in claim 1, wherein the quantity of returned phosphoric acid solution of step (e(iii)) is insufficient to provide the theoretical quantity of water calculated in step (e(i)), and the water added directly to the attack tank is provided through a line by-passing the filter.

5. The method in claim 4, wherein any changes in the amount of water supplied through the by-pass line are effected over a period sufficient to preclude excessive dilution of the phosphoric acid concentration in the attack tank.

6. In a method for controlling the concentration of phosphoric acid product from a continuous phosphoric acid recovery process in which phosphate ore is supplied in aqueous slurry to an attack tank in which the ore is subjected to attack in an acidic solution containing sulfuric and phosphoric acids to produce a product slurry comprising an aqueous phosphoric acid solution and calcium sulfate, the slurry is separated by filtration to form aqueous phosphoric acid solution and calcium sulfate filter cake, the cake is rinsed with water to recover additional phosphoric acid therefrom and form a phosphoric acid solution which is returned to the attack tank, and in which the quantity of water supplied to the attack tank from addition of aqueous sulfuric acid solution, returned phosphoric acid solution, and water added directly to the attack tank is controlled, the improvement comprising:

(a) calculating a theoretical quantity of water which, when added to the attack tank, maximizes the recovery of phosphoric acid:

(b) controlling the quantity of rinse water to maximize the recovery of the returned phosphoric acid solution from the cake by pulsing the flow rate of the rinse water a plurality of times in a predetermined minor amount relative to the rinse water flow for a predetermined interval to determine the quantity of rinse water required to maximize the recovery of phosphoric acid from the cake;

(c) measuring the amount of rinse water delivered to the attack tank in the returned phosphoric acid solution; and (d) adjusting the quantity of water added to the attack tank to achieve addition of the theoretical quantity required in step (a) by controlling the sulfuric acid concentration, the quantity of rinse water from step (b) and the amount of water delivered to the attack tank as measured in (c), and the quantity of water added directly to the attack tank.

7. The method as in claim 6, wherein the filter is selected from a two or a three-stage counter-current filter.

8. The method as in claim 6, wherein the attack tank comprises a multistage attack tank.

9. The method as in claim 6, wherein any changes of the flow rate of the quantity of rinse water added to the filter are effected over a period sufficient to preclude the filter from discharging rinse water with the filter cake due to the filter's inability to accept more water.

10. The method as in claim 6, wherein the quantity of rinse water added to the filter to maximize the recovery of the returned phosphoric acid solution is essentially equal to the quantity of the water in the phosphoric acid solution returned to the attack tank.

11. The method as in claim 6, wherein the quantity of returned phosphoric acid solution of step (c) is insufficient to provide the theoretical quantity of water calculated in step (a), and the water added directly to the attack tank is provided through a line by-passing the filter.

12. The method in claim 11, wherein any changes in the amount of water supplied through the by-pass line are effected over a period sufficient to preclude excessive dilution of the phosphoric acid concentration in the attack tank.

13. The method as in claim 6, wherein the filter is selected from a two or a three-stage counter-current filter.

14. The method as in claim 6, wherein the attack tank comprises a multistage attack tank.

* * * * *

UNITED STATES PATENT AND TRADEMARK OFFICE
CERTIFICATE OF CORRECTION

PATENT NO. : 5,188,812

DATED : February 23, 1993

INVENTOR(S) : Stephen W. Hilakos

It is certified that error appears in the above-identified patent and that said Letters Patent is hereby corrected as shown below:

Column 20, line 6, "is" should read --if--.

Signed and Sealed this

Twenty-third Day of November, 1993

Attest:

BRUCE LEHMAN

Attesting Officer

Commissioner of Patents and Trademarks